United States Patent
Madsen et al.

(10) Patent No.: US 9,735,676 B2
(45) Date of Patent: Aug. 15, 2017

(54) SELF-OSCILLATING RESONANT POWER CONVERTER

(71) Applicant: Danmarks Tekniske Universitet, Kgs. Lyngby (DK)

(72) Inventors: Mickey P Madsen, Kgs. Lyngby (DK); Jeppe Arnsdorf Pedersen, Copenhagen (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 23 days.

(21) Appl. No.: 14/439,412

(22) PCT Filed: Oct. 29, 2013

(86) PCT No.: PCT/EP2013/072548
§ 371 (c)(1),
(2) Date: Apr. 29, 2015

(87) PCT Pub. No.: WO2014/067915
PCT Pub. Date: May 8, 2014

(65) Prior Publication Data
US 2015/0303806 A1 Oct. 22, 2015

(30) Foreign Application Priority Data

Nov. 2, 2012 (EP) ..................................... 12191129

(51) Int. Cl.
*H02M 3/156* (2006.01)
*H02M 3/158* (2006.01)
(Continued)

(52) U.S. Cl.
CPC ......... *H02M 3/158* (2013.01); *H02M 3/1588* (2013.01); *H02M 7/5383* (2013.01);
(Continued)

(58) Field of Classification Search
CPC ............ Y02B 70/1416; Y02B 70/1433; Y02B 70/1441; H02M 3/335; H02M 3/33507;
(Continued)

(56) References Cited

U.S. PATENT DOCUMENTS 4,605,999 A 8/1986 Bowman
4,891,746 A 1/1990 Bowman
(Continued)

OTHER PUBLICATIONS

Toke M Anderson et al, A VHF Class E DC-DC Converter with Self-Oscillating Gate Driver, Applied Power Electronics Conference and Exposition (APEC), 2011 twenty-Sixth Annual IEEE, Mar. 6, 2011, pp. 885-891, XP032013983.

(Continued)

*Primary Examiner* — Gary L Laxton
(74) *Attorney, Agent, or Firm* — Peter A. Nieves; Sheehan Phinney Bass & Green PA

(57) ABSTRACT

Resonant power converters and inverters comprising a self-oscillating feedback loop coupled from a switch output to a control input of a switching network comprising one or more semiconductor switches (S1, S2). The self-oscillating feedback loop sets a switching frequency of the power converter (100) and comprises a first intrinsic switch capacitance (CGD) coupled between a switch output and a control input of the switching network and a first inductor (LG). The first inductor (LG) is coupled in-between a first bias voltage source and the control input of the switching network and has a substantially fixed inductance. The first bias voltage source is configured to generate an adjustable bias voltage (VBias) applied to the first inductor (LG). The output voltage (V0UT) of the power converter (100) is controlled in a flexible and rapid manner by controlling the adjustable bias voltage (VBias).

32 Claims, 10 Drawing Sheets

(51) Int. Cl.
*H02M 7/5383* (2007.01)
*H02M 1/00* (2006.01)

(52) U.S. Cl.
CPC .. *H02M 2001/0058* (2013.01); *Y02B 70/1425* (2013.01); *Y02B 70/1441* (2013.01); *Y02B 70/1466* (2013.01); *Y02B 70/1491* (2013.01)

(58) Field of Classification Search
CPC ..... H02M 3/33523; H02M 2007/4815; H02M 2007/4818; H02M 2007/4822; H02M 3/156; H02M 3/158
See application file for complete search history.

(56) References Cited

U.S. PATENT DOCUMENTS 6,101,102 A * 8/2000 Brand ............... H02M 1/12
257/E27.049
7,889,519 B2 * 2/2011 Perreault ............ H02M 1/34
323/222

OTHER PUBLICATIONS

Matsuo M et al., AC/AC Converter with Class DE Tuned Power Oscillator, Telecommunications Energy Conference, 1998, Intelec. Twentieth Inernational San Francisco, CA Oct. 4-8, 1998, IEEE, Piscataway, NJ, Oct. 4, 1998, pp. 685-691, XP019359577.

* cited by examiner

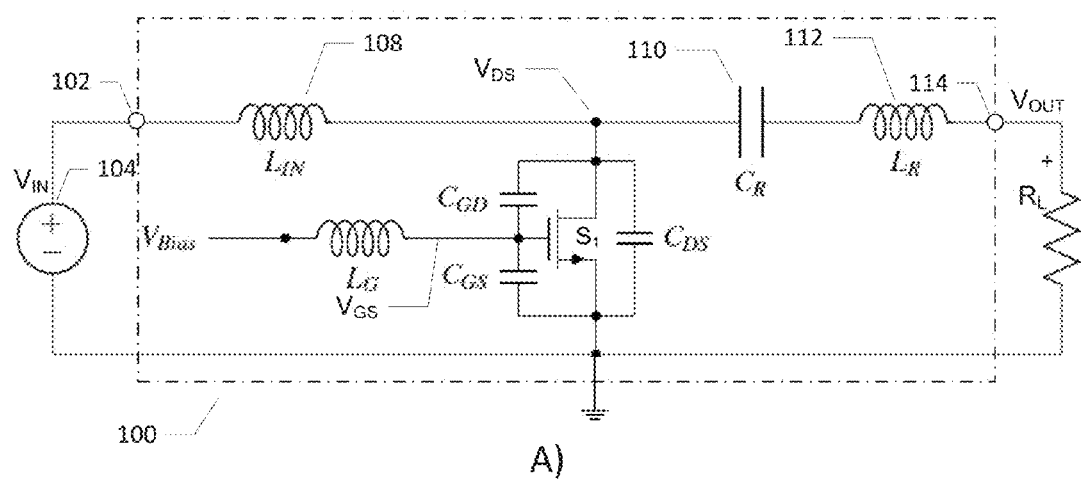
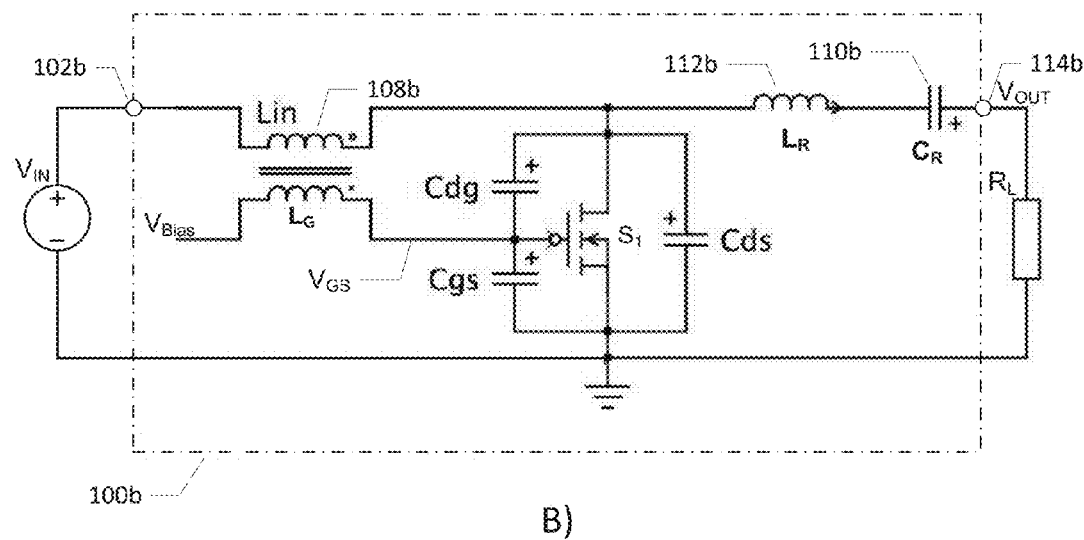
FIGS. 1A, B

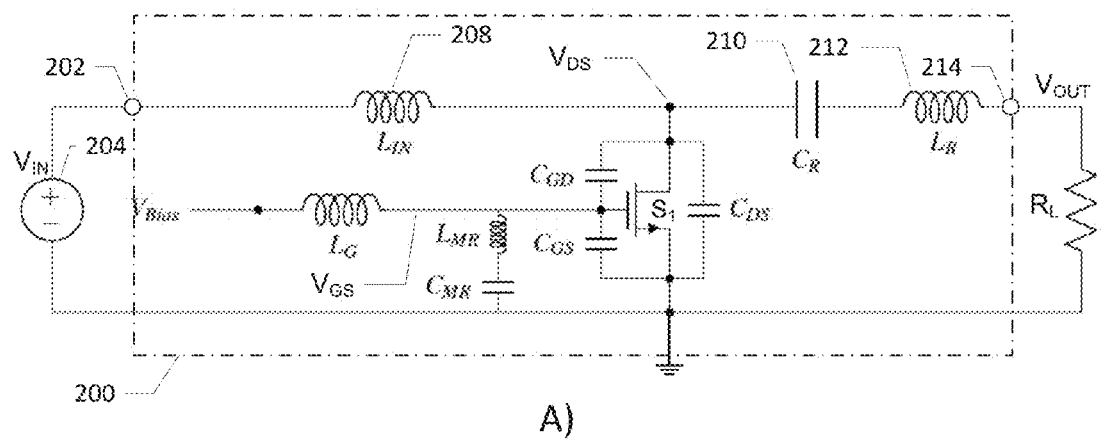
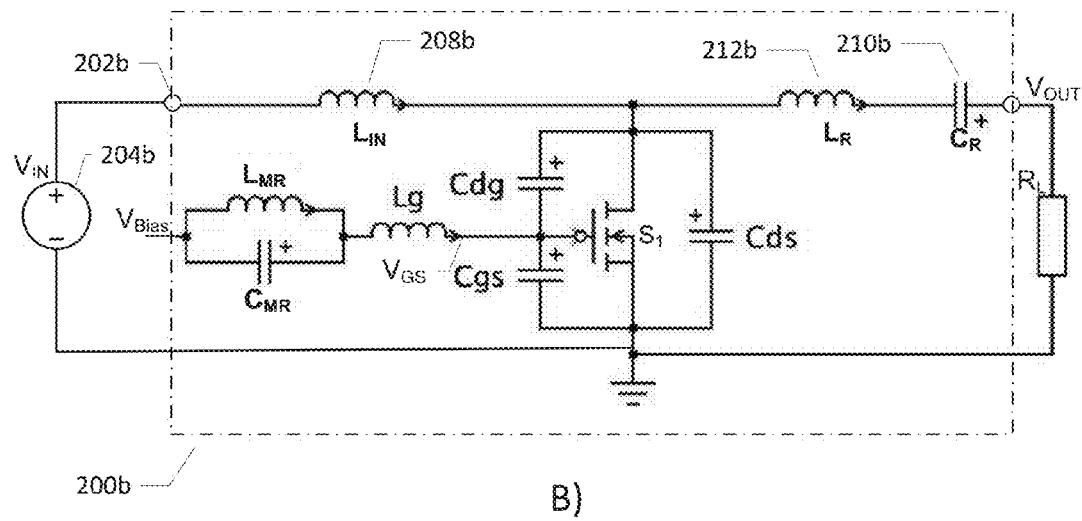
FIGS. 2A, B

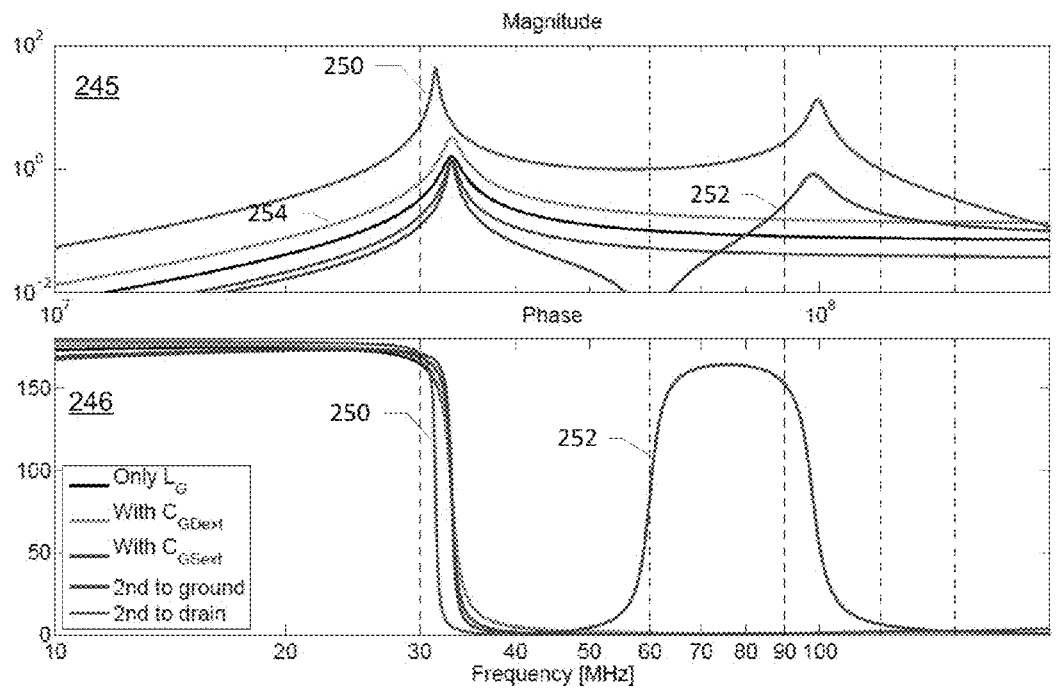
D)
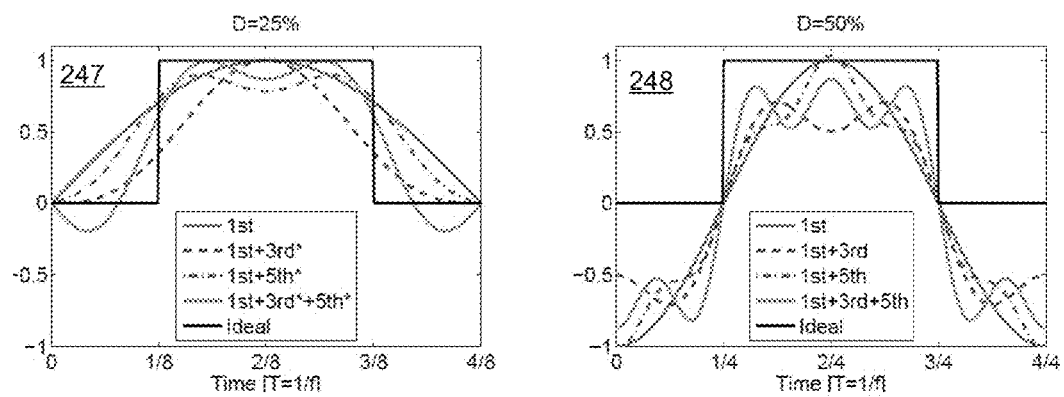
E)
FIGS. 2D, E

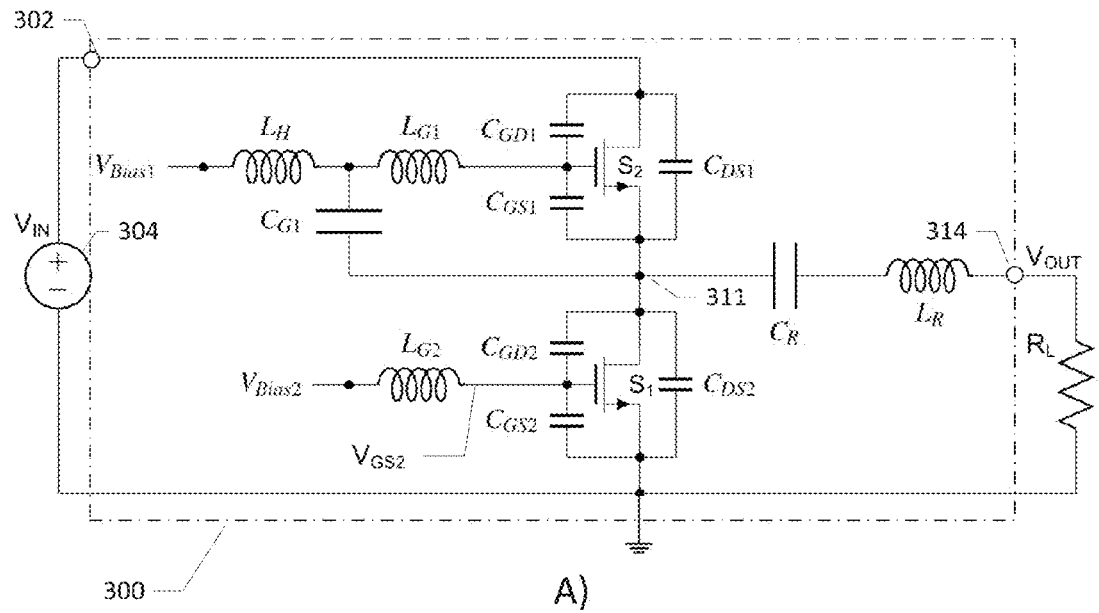
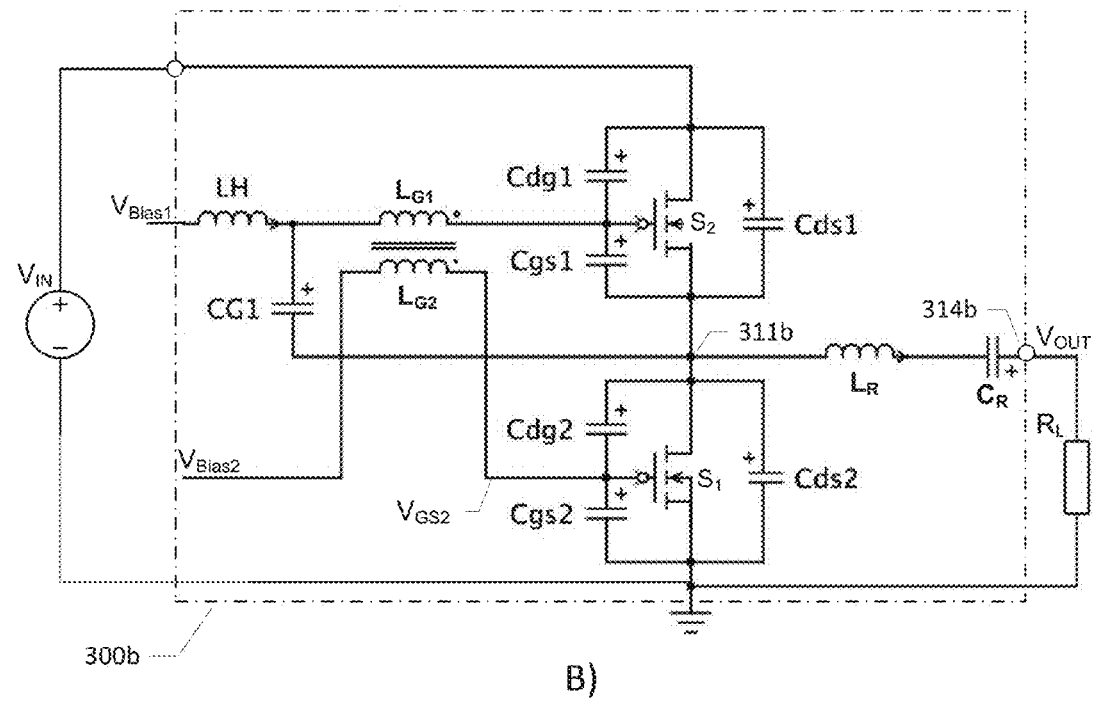
FIGS. 3A, B

SELF-OSCILLATING RESONANT POWER CONVERTER

The present invention relates to resonant power converters and inverters comprising a self-oscillating feedback loop coupled from a switch output to a control input of a switching network comprising one or more semiconductor switches. The self-oscillating feedback loop sets a switching frequency of the power converter and comprises a first intrinsic switch capacitance coupled between a switch output and a control input of the switching network and a first inductor. The first inductor is coupled in-between a first bias voltage source and the control input of the switching network and has a substantially fixed inductance. The first bias voltage source is configured to generate an adjustable bias voltage applied to the first inductor. The output voltage of the power converter is controlled in a flexible and rapid manner by controlling the adjustable bias voltage.

BACKGROUND OF THE INVENTION

Power density is always a key performance metric of a power supply circuit such as AC-DC, DC-AC and DC-DC power converters to provide the smallest possible physical size for a given output power specification. Resonant power converter topologies are well-known types of DC-DC/switched mode power supplies or converters (SMPS) in the art. Resonant power converters are particularly useful for high switching frequencies such as above 1 MHz where switching losses of standard SMPS topologies (Buck, Boost etc.) tend to be unacceptable for conversion efficiency reasons. High switching frequencies are generally desirable because of the resulting decrease of the electrical and physical size of circuit components of the power converter like inductors and capacitors. The smaller components allow increase of the power density of the SMPS. In a resonant power converter an input "chopper" semiconductor switch (often MOSFET or IGBT) of the standard SMPS is replaced with a "resonant" semiconductor switch. The resonant semiconductor switch relies on the resonances of circuit capacitances and inductances to shape the waveform of either the current or the voltage across the switching element such that, when switching takes place, there is no current through or voltage across the switching element. Hence power dissipation is largely eliminated in at least some of the intrinsic capacitances of the input switching element such that a dramatic increase of the switching frequency becomes feasible for example to values above 10 MHz. This concept is known in the art under designations like zero voltage and/or current switching (ZVS and/or ZCS) operation. Commonly used switched mode power converters operating under ZVS and/or ZCS are often described as class E, class F or class DE inverters or power converters.

However, fast and accurate control of the output voltage of the resonant power converter remains a challenge. Prior art power converters described in the references below propose to utilize a self-oscillating feedback loop around the input switching element and driven by the intrinsic or inherent drain-to-source capacitance of a MOSFET switch in combination with a variable series inductance coupled to the gate terminal of the MOSFET switch.

U.S. Pat. No. 4,605,999 discloses a self-oscillating power converter comprising a self-oscillating inverter circuit build around a single MOSFET switch. The inherent drain-to-source capacitance of the MOSFET switch supplies a feedback path sufficient to sustain self-oscillation of the inverter circuit if the frequency of operation is sufficiently high. The power converter is voltage regulated by a feedback loop deriving the control signal from a DC output voltage of the converter and applying the control signal to a variable inductance network comprising an inductor and a pair of nonlinear capacitances.

U.S. Pat. No. 5,430,632 discloses a self-oscillating power converter utilizing a pair of MOSFET transistor switches in a half bridge configuration wherein the junction of the two MOSFET transistors is coupled to a reactive network which in turn is connected to an output rectifier. Intrinsic gate-to-drain inter-electrode capacitances of the switching transistors serve as the sole means of sustaining oscillations. Oscillations are initiated at the gate-to-source terminals of the MOSFET transistor switches by a start-up circuit. The frequency of oscillation is determined by the gate-to-source capacitance of the MOSFET transistor switches and the inductance of an isolated gate drive transformer. The frequency of oscillation is controlled by varying inductance of the isolated gate drive transformer coupled to the gate terminals of the MOSFET transistor switches through a pair of control windings.

However, the possible regulation range of adjustable inductances and/or capacitances tend to be very narrow due to physical component limitations and the accuracy may also be limited. Furthermore, adjustable inductances and/or capacitances are difficult to integrate on semiconductor substrates or on ordinary circuit carriers like printed circuit boards. Finally, the maximum regulation speed of the inductance or capacitance may be limited due to the reactive nature of the component leading to an undesirable limitation of the speed of the regulation of the converter output voltage. This is of course particularly undesirable in view of the advantages of moving to higher converter switching frequencies for the reasons discussed above.

Consequently, it would be advantageous to provide a control mechanism for the oscillation frequency that eliminates the need of variable reactive components like inductors and capacitors such that the converter output voltage can be controlled by appropriately controlling a level of a circuit voltage or circuit current for example in the form of an adjustable bias voltage

SUMMARY OF THE INVENTION

A first aspect of the invention relates to a resonant power converter or inverter comprising an input terminal for receipt of an input voltage and a switching network comprising one or more semiconductor switches controlled by respective control inputs. The switching network comprises a switch input operatively coupled to the input terminal for receipt of the input voltage and a switch output operatively coupled to an input of a resonant network of the resonant power converter. The resonant network comprises a predetermined resonance frequency ($f_R$) and an output operatively coupled to a converter output terminal. A self-oscillating feedback loop is coupled from the switch output to a control input of the switching network to set a switching frequency of the power converter. The self-oscillating feedback loop comprises a first intrinsic switch capacitance coupled between the switch output and the control input of the switching network, a first bias voltage source configured to generate a first adjustable bias voltage, a first inductor with substantially fixed inductance coupled in-between the first bias voltage source and the control input of the switching network. A voltage regulation loop of the resonant power converter is configured to control an output voltage of the power converter by controlling the first adjustable bias voltage applied to the first inductor.

The present resonant power converter allows flexible, rapid and accurate control of the converter output voltage by controlling the adjustable bias voltage applied to the first inductor coupled to the control input of the switching network. By adjusting a level of the adjustable bias voltage, an oscillation frequency of the self-oscillating feedback loop coupled around the switching network can be controlled so as to set a switching frequency of the resonant power converter. The adjustment of the oscillation frequency of the self-oscillating feedback loop is achieved without making any adjustment of the inductance of the first inductor which therefore has a substantially fixed inductance independent of the level of the adjustable bias voltage. The skilled person will understand that the term "substantially fixed" characterizing the inductance of the first inductor includes an inductance that vary slightly over temperature depending on electrical characteristics of a particular material of the selected inductor type. Furthermore, the application of the first adjustable bias voltage to the first inductor is preferably carried out without any adjustment of an inductive or capacitive reactance of a component coupled in series with the first inductor in the voltage regulation loop. Hence, the first adjustable bias voltage generated by the voltage regulation loop is preferably applied to the first inductor without any transformer, tuneable inductor or tuneable capacitor in series with the first inductor.

The ability of adjusting the switching frequency of the present resonant power converter by adjusting the level of the first adjustable bias voltage enables a wide and accurate control range of the switching frequency and eliminates or circumvents the previously discussed disadvantages of relying on adjustable inductances and/or capacitances to adjust the switching frequency of the resonant power converter. Power losses in intrinsic or parasitic capacitances such as the first intrinsic switch capacitance of the one or more semiconductor switches are furthermore reduced to a low level by the presence of first inductor because energy stored in these parasitic capacitances during charging is discharged to, and temporarily stored in, the first inductor. The stored energy in the first inductor is subsequently returned to parasitic or intrinsic capacitances of the one or more semiconductor switches. The parasitic or intrinsic capacitances may comprise gate-source, gate-drain and drain-source capacitances of a MOSFET switch.

While the present invention is described in detail in the following with reference to implementations in resonant power converters/inverters and corresponding DC-DC power converters of Class E or DE type or topology, the skilled person will understand that the invention is equally applicable to other types of resonant power inverters, rectifiers and converters such as class E, F, DE and $\pi_2$ inverters and rectifiers and resonant boost, buck, SEPIC, LCC, LLC converters etc.

The voltage regulation loop may comprise a reference voltage generator supplying a DC or AC reference voltage to a first input of a comparator or error amplifier. A second input of the comparator may be coupled to the converter output voltage and an output of the comparator may be operatively coupled to a control input of the first bias voltage source. In this manner, the comparator or error amplifier may be configured to generate a suitable error signal as control signal for the first bias voltage source by a comparison of the output voltage of the converter with the DC or AC reference voltage. The error signal or signals applied to the first bias voltage source increases or decreases the first adjustable bias voltage in an appropriate direction to adjust the converter output voltage to the target output voltage indicated by the DC or AC reference voltage as explained in additional detail below in connection with the accompanying drawings.

The skilled person will appreciate that the switching network can comprise numerous types of switch topologies such as single switch topology, half-bridge or full-bridge switch topologies. According to a preferred embodiment, the switching network comprises a first semiconductor switch with a control terminal coupled to the control input of the switching network and an output terminal coupled to the switch input and to the switch output. An input inductor is coupled between the input voltage and the switch input. This embodiment may comprise a basic class E power inverter or converter wherein the switching network comprises a single semiconductor switch with its output terminal, e.g. a drain terminal of a MOSFET, coupled both to the input and output of the switching network. The input inductor forms part of the resonant network to control the setting of the predetermined resonance frequency ($f_R$). The control terminal, e.g. a gate or base terminal, of the single semiconductor switch is coupled to the control input of the switching network.

The input inductor and the first inductor may be magnetically coupled with a predetermined magnetic coupling coefficient, preferably a magnetic coupling coefficient larger than 0.1 or even more preferably larger than 0.4. The magnetic coupling provides a number of advantages relative to the case of uncoupled input and first inductors such as improved phase response between the signal at the control input of the switching network and the switch output and larger and more constant gain. The magnetic coupling ensures that the inductor currents of the input inductor and first inductor are out of phase. Consequently, a phase shift between the control input signal, e.g. a gate voltage of the MOSFET switch, of the switching network and the switch output is very close to 180 degrees. Furthermore, the magnetic coupling is preferably substantially constant across a wide frequency range to provide a more constant level of the first adjustable bias voltage when the output voltage $V_{OUT}$ of the power converter is regulated.

Another preferred embodiment of the present resonant power converter comprises a half-bridge based switching network. The switching network comprises a first semiconductor switch coupled between the switch output and a voltage supply rail of the resonant power converter and having a control terminal coupled to the control input of the switching network. The switching network additionally comprises a second semiconductor switch coupled between the switch output and the input terminal. A control terminal of the second semiconductor switch is coupled to a second bias voltage source through a cascade of a second inductor with substantially fixed inductance and a third inductor with substantially fixed inductance. A feedback capacitor of the switching network is coupled between the switch output and an intermediate node between the second and third inductors. This embodiment of the present resonant power converter may comprise a class DE power converter, inverter or form part of a class DE based DC-DC power converter.

The feedback capacitor serves as a bootstrap device which raises a voltage level supplied to the control terminal of the second semiconductor switch and thereby facilitates use of a N-channel MOSFET transistor as semiconductor switch device. The second inductor serves as a high impedance signal path at the oscillation frequency allowing passage of a relatively slowly varying bias voltage component generated by the second bias voltage source, but blocking passage of a relatively high frequency voltage component supplied through the feedback capacitor. Consequently, by combining bias voltage components supplied through the second inductor and the feedback capacitor, the control voltage at the second switch is level shifted and referred to the switch output instead of the voltage supply rail of the first semiconductor switch such as ground or a negative power supply voltage if the input voltage is a positive DC voltage. The self-oscillation loop may be configured to ensure that each of the semiconductor switches $S_1$ and $S_2$ is alternately switched between conducting and non-conducting states. The semiconductor switches $S_1$ and $S_2$ are also switched in opposite phase according to a non-overlapping scheme.

The first inductor and the third inductor may be magnetically coupled with a predetermined magnetic coupling coefficient, preferably a magnetic coupling coefficient larger than 0.1 or even more preferably larger than 0.4. The magnetic coupling will force a phase shift that is substantially 180 degrees between the control input signals, e.g. gate signals or voltages, of the first and second semiconductor switches. To provide a large magnetic coupling coefficient between the input inductor and the first inductor these may be wound around a common magnetically permeable member or core. For the same reason, the first inductor and the third inductor may be wound around a common magnetically permeable member or core.

The first bias voltage source may be configured in various ways. In one embodiment, the first bias voltage source may be coupled between a suitable DC bias or reference voltage of the resonant power converter and a ground potential or negative supply rail thereof. The first adjustable bias voltage may be derived from the DC bias or reference voltage by suitable voltage division or regulation circuitry. In one embodiment, the first bias voltage source comprises a capacitor coupled from the first adjustable bias voltage to a fixed electric potential of the resonant power converter such as ground. A first adjustable resistor is coupled between the first adjustable bias voltage and a first DC reference voltage and a second adjustable resistor is coupled between the first adjustable bias voltage and a second DC reference voltage. The first DC reference voltage may possess a DC voltage higher than a maximum peak voltage of the first adjustable bias voltage. The second DC reference voltage may possess a DC voltage lower than an expected minimum voltage of the first adjustable bias voltage such that the first adjustable bias voltage can be varied through a suitable voltage regulation range by adjusting a resistance ratio between the first and second adjustable resistances. Each of the first and second adjustable resistors preferably comprises a MOS transistor allowing the respective resistances to be controlled from a high impedance gate terminal of the MOS transistor.

The first inductor may have an inductance between 1 nH and 10 µH such as between 1 nH and 50 nH. The latter inductance range makes it possible to form the first inductor as an electrical trace pattern of a printed circuit board or as an integrated passive semiconductor component leading to considerable size reduction and reliability advantages of the resonant power converter.

The substantially fixed inductance of the first inductor is preferably determined experimentally for example by adjusting its value until a suitable voltage swing is obtained at the control input of the switching network as explained below in additional detail. Preferably, the substantially fixed inductance is set such that a peak voltage at the control input of the switching network exceeds a threshold voltage of at least one of the semiconductor switches of the switching network. This threshold voltage may for example lie between 5 and 10 V for an N-channel power MOSFET, but the skilled person will appreciate that other types of semiconductor switches may have different threshold voltages depending on characteristics of the semiconductor technology in question.

In one embodiment, the substantially fixed inductance of the first inductor is selected such that a peak-peak voltage swing at the control input of the switching network is approximately equal to a numerical value of the threshold voltage of the at least one of the semiconductor switches of the switching network. In the above-mentioned example in respect of the N-channel power MOSFET, the peak-peak voltage swing would accordingly be adjusted to a value between 5 and 10 V in accordance with the threshold voltage.

In another embodiment, the self-oscillating feedback loop comprises a series resonant circuit coupled in-between the control input of the first semiconductor switch and a fixed electric potential of the converter. The series resonant circuit preferably comprises a cascade of capacitor and an inductor connected between the control input of the semiconductor switch and a negative power supply rail e.g. ground. The series resonant circuit functions to introduce additional uneven frequency components, by attenuating one or more even harmonic frequency components, to a fundamental frequency component of the oscillating voltage waveform at the control input of the switching network, e.g. the gate of the first semiconductor switch. This leads to a trapezoidal waveform shape of the oscillating voltage waveform and results in faster switch turn-on and turn-off times.

A useful embodiment of the present resonant power converter comprises a DC-DC power converter. The DC-DC power converter is preferably constructed or derived by coupling a rectifier between the output of the resonant network and the inverter or converter output terminal to generate a rectified DC output voltage. The rectifier may comprise one or more diodes to provide passive rectification of the DC output voltage. The rectifier of an alternative embodiment of the resonant power converter comprises a synchronous rectifier which may comprise one or more semiconductor switches. According to one such embodiment the synchronous rectifier comprises: a rectification semiconductor switch configured to rectify an output voltage of the resonant network in accordance with a rectifier control input of the rectification semiconductor switch. A first rectification inductor with a substantially fixed inductance is coupled in-between a fixed or adjustable rectifier bias voltage and the rectifier control input. It is a significant advantage of this embodiment that the fixed or adjustable rectifier bias voltage of the rectifier may be left decoupled or unconnected to the first bias voltage source generating the first adjustable bias voltage for the switching network on the input side of the resonant power converter for the reasons discussed in detail below with reference to FIG. 8 of the appended drawings. The fixed or adjustable rectifier bias voltage may for example be coupled to a fixed DC bias voltage source of the resonance power converter or to the rectified DC output voltage through a resistive or capacitive voltage divider.

The skilled person will appreciate that numerous types of semiconductor transistors may be used to implement each of the first and second semiconductor switches depending on requirements such as threshold voltage, gate source break-down voltage, drain source break-down voltage etc., imposed by any particular resonant power converter. Each of the first and second semiconductor switches may for example comprise a MOSFET or IGBT such as a Gallium Nitride (GaN) or Silicon Carbide (SiC) MOSFET.

A second aspect of the invention relates to a resonant power converter assembly comprising a resonant power converter according to any of the above described embodiments thereof and a carrier substrate having at least the switching network and the resonant circuit integrated thereon wherein an electrical trace pattern of the carrier substrate is forming the first inductor. The carrier substrate may comprise a single-layer or multi-layer printed circuit board with integrally formed electrical wiring patterns interconnecting various electronic components of the resonant power converter. The relative small inductance required for the first inductance for achieving VHF switching frequencies of the power converter, e.g. in the order of tens of nH, facilitates an advantageous integration of the first inductor, and potentially other inductors of the power converter of suitable size, directly in the wiring pattern of carrier substrates like printed circuit boards. This type of integration leads to several advantages such as saving component costs, reducing assembly time and costs and possibly improving reliability of the power converter assembly.

A particularly advantageous embodiment of the carrier substrate comprises a semiconductor die, such as a CMOS based integrated circuit, integrating all active and passive components of the present resonant power converter thereon.

BRIEF DESCRIPTION OF THE DRAWINGS

A preferred embodiment of the invention will be described in more detail in connection with the appended drawings, in which:

FIG. 1A) is an electrical circuit diagram of a class E resonant power converter in accordance with a first embodiment of the invention, FIG. 1B) is an electrical circuit diagram of a class E resonant power converter comprising a pair of magnetically inductors in accordance with a second embodiment of the invention, FIG. 2A) is an electrical circuit diagram of a class E resonant power converter comprising a series resonant circuit in accordance with a third embodiment of the invention, FIG. 2B) is an electrical circuit diagram of a class E resonant power converter comprising a series resonant circuit in accordance with a fourth embodiment of the invention, FIG. 2C) is an electrical circuit diagram of a gate drive circuit for class E and DE resonant power converters comprising a plurality of series resonant circuits, FIG. 2D) shows a plurality of magnitude and phase response curves of transfer functions of a MOSFET switch of the class E resonant power converter in accordance with the third embodiment of the invention, FIG. 2E) shows a plurality of control input signal waveforms of the MOSFET switch of the class E resonant power converter in accordance with the third embodiment of the invention, FIG. 3A) is an electrical circuit diagram of a class DE resonant power converter in accordance with a fifth embodiment of the invention, FIG. 3B) is an electrical circuit diagram of a class DE resonant power converter comprising a pair of magnetically coupled inductors in accordance with a sixth embodiment of the invention.

DETAILED DESCRIPTION OF PREFERRED EMBODIMENTS

Figure 2C:
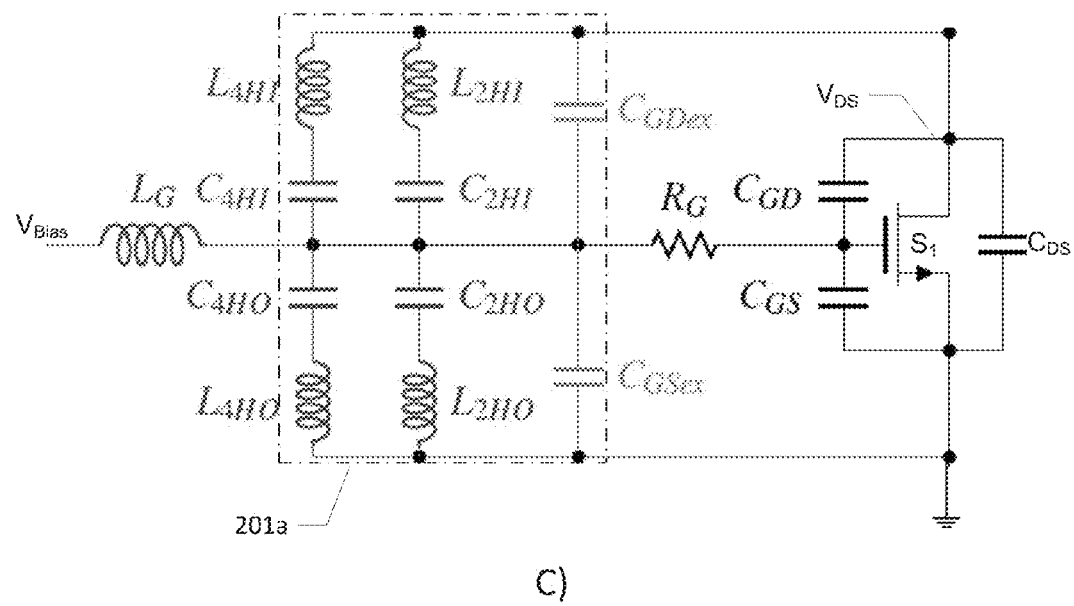

FIG. 1A) is a simplified electrical circuit diagram of a class E resonant power converter 100 in accordance with a first embodiment of the invention. The present class E resonant power converter is particularly well-adapted for operation in the VHF frequency range for example at switching frequencies above 10 MHz or even higher such as between 30 and 300 MHz due to, amongst other factors, low switching losses in connection with the operation of a self-oscillating feedback loop connected around a transistor switch element $S_1$ as explained in further detail below.

The class E resonant power inverter or converter 100 comprises an input pad or terminal 102 for receipt of a DC input voltage $V_{IN}$ from a DC power supply 104. The DC voltage level may vary considerably according to requirements of any particular conversion application such as lying between 1 V and 500 V for example between 10 V and 230 V. A switching network comprises a single switch transistor $S_1$. The skilled person will understand that the switch transistor $S_1$ can comprise different types of semiconductor transistors such as MOSFETs and IGBTs. The skilled person will likewise understand that the switch transistor $S_1$ in practice can be formed by a plurality of parallel separate transistors e.g. to distribute operational currents between multiple devices. In one embodiment of the invention, $S_1$ is formed by an IRF5802 power MOSFET available from the manufacturer International Rectifier. A gate terminal $V_{GS}$ of the switch transistor $S_1$ forms a control input of the switching network allowing $S_1$ to be switched between a conducting state or on-state with low resistance between the drain and source terminals and a non-conducting state or off-state with very large resistance between the drain and source terminals. A drain terminal $V_{DS}$ of the switch transistor $S_1$ forms both a switch input and a switch output of the switching network in the present embodiment based on a single switch transistor. The drain terminal $V_{DS}$ is at one side coupled to the DC input voltage through an input inductor $L_{IN}$ (108). The drain terminal $V_{DS}$ is also coupled to a first side of a series resonant network comprising resonant capacitor $C_R$ and resonant inductor $L_R$. The input inductor $L_{IN}$, resonant capacitor $C_R$, an intrinsic drain-source capacitance $C_{DS}$ of the MOSFET $S_1$ and the resonant inductor $L_R$ (112) form in conjunction a resonant network of the power converter 100. A second and opposite side of the series resonant network is operatively coupled to an output terminal 114 or node of the class E resonant power converter 100 either directly as illustrated or through a suitable rectification circuit as illustrated in detail below. An inverter load is schematically indicated by a load resistor $R_{LOAD}$ connected to the converter at the output terminal 114 and may generally exhibit inductive, capacitive or resistive impedance. The resonant network is designed with a resonance frequency ($f_R$) of about 50 MHz in the present implementation, but the resonance frequency may vary depending on requirements of the application in question. In practice, the respective values of the resonant capacitor $C_R$ and resonant inductor $L_R$ may be selected such that a target output power at the converter output is reached for a particular load impedance. Thereafter, the value of the input inductor $L_{IN}$ is selected such that a desired or target value of the predetermined resonance frequency ($f_R$) is reached in view of the intrinsic drain-source capacitance $C_{DS}$ for the selected switch transistor.

The present class E resonant power converter 100 comprises a self-oscillating feedback loop arranged around the transistor switch $S_1$ such that the oscillation frequency of the loop sets the switching or operational frequency of the power converter 100 as briefly mentioned above. The self-oscillating feedback loop comprises an intrinsic gate-drain capacitance $C_{GD}$ of the transistor switch $S_1$ which transmits a 180 degree phase shifted portion of the switch output signal at the drain terminal $V_{DS}$ back to the gate terminal of the transistor switch $S_1$. Additional loop phase shift is introduced by the gate inductor $L_G$ which preferably comprises a substantially fixed inductance. The gate inductor $L_G$ is coupled in-between a variable bias voltage $V_{Bias}$ and the gate terminal of the transistor switch $S_1$. The variable bias voltage $V_{Bias}$ is generated by a bias voltage generator or source with a design explained in further detail below in connection with FIG. 4. However, the adjustable bias voltage $V_{Bias}$ applied to the gate terminal of transistor switch $S_1$ through the gate inductor $L_G$ provides an advantageous mechanism for controlling the converter output voltage $V_{OUT}$. This mechanism exploits that the time period of the cycle time, the cycle time being the reciprocal of the oscillation frequency of the feedback loop, during which $S_1$ remains in a non-conducting state is controlled by the previously mentioned components of the resonant network defining the resonance frequency ($f_R$). The latter frequency controls when the voltage at the switch output at $V_{DS}$ reaches ground or zero volts, being the lower power supply rail of the converter in the present embodiment, and thereby allowing $S_1$ to be turned on again without introducing switching losses to discharge the intrinsic drain-source capacitance $C_{DS}$. This operation mechanism where the resonant circuit is used to discharge the intrinsic semiconductor switch capacitance until the voltage across the semiconductor switch reaches approximately zero is normally denoted zero voltage switching (ZVS) operation.

Conversely, the time period of the cycle time during which $S_1$ remains conducting, or in its on-state, can be controlled by the level of the adjustable bias voltage. This property allows a duty cycle, and hence the oscillation frequency of the self-oscillating loop, to be adjusted. This is explained in further detail in connection with FIG. 5 below. Since the switch output at $V_{DS}$ is coupled directly to the DC input voltage through the input inductor $L_{IN}$ the average voltage at the switch output $V_{DS}$ is forced to equal the DC input voltage. The integral of a half-period sine waveform of frequency ($f_R$) equals the sine amplitude divided by pi times the resonance frequency ($f_R$). Furthermore, when $S_1$ is conducting the voltage across $S_1$ is essentially zero such that the voltage at the switch output $V_{DS}$ becomes substantially zero. These circumstances lead to the following equation for a peak voltage, $V_{DS,PEAK}$, across $S_1$:

$$V_{DS,PEAK} = \frac{V_{IN} * \pi * f_R}{f_S}; \quad (1)$$

wherein $f_S$=The oscillation frequency of the self-oscillation loop which equals the switching frequency of the power converter.

Equation (1) reveals that a decreasing oscillation frequency leads to increasing switch output voltage $V_{DS}$ as illustrated below by switch output voltages $V_{DS}$ of FIG. 5.

Figure 5:
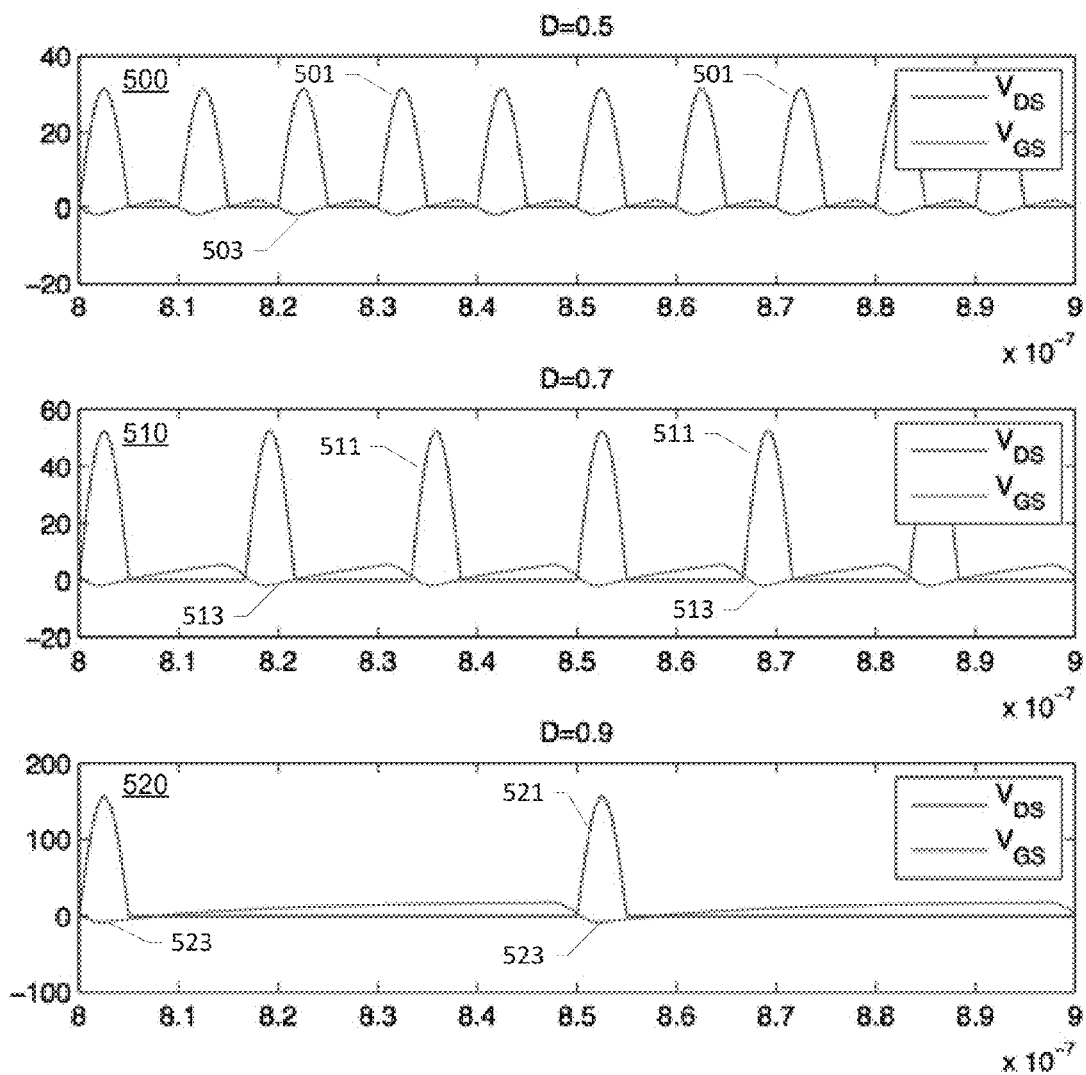
FIG. 5 shows a series of graphs illustrating voltage waveforms at the output of a switching network of the class E resonant power converter of the first embodiment for different bias voltage levels applied to the control input of the switching network.

The voltage waveforms, duty cycle control and oscillation frequency control discussed above are illustrated on the graphs 500, 510 and 520 of FIG. 5 for three different levels of the adjustable bias voltage $V_{Bias}$ applied to the substantially fixed inductance gate inductor $L_G$. The scale on the y-axis of all graphs indicates voltage in volts while the x-axis scale indicates time in steps of 10 ns such that the entire x-axis spans over about 100 ns. As mentioned above, $L_G$ is coupled to the control input or gate $V_{GS}$ of the transistor switch $S_1$. In graph 500, the adjustable bias voltage $V_{Bias}$ has been adjusted to a level which results in a duty cycle of approximately 0.5 in the switch output voltage $V_{DS}$. Waveform 501 shows the switch output voltage $V_{DS}$ while waveform 503 shows the corresponding gate-source voltage applied to the gate $V_{GS}$ of $S_1$. It is evident that the cycle time of the switch output voltage $V_{DS}$ is about 10 s corresponding to an oscillation frequency of about 100 MHz.

In practice, the substantially fixed inductance of the gate inductor $L_G$ may be selected such that a desired voltage amplitude of the (oscillating) gate-source voltage waveform is achieved. The voltage amplitude is preferably adjusted such that a suitable peak voltage at the gate terminal of MOSFET switch $S_1$ is reached in view of its threshold voltage and its gate break-down voltage. This means that the peak voltage at the gate terminal should be sufficiently large to exceed the threshold voltage of the chosen semiconductor switch, e.g. $V_{TH}$ of MOSFET switch $S_1$. The oscillation frequency $f_S$ of the self-oscillation loop will inherently lie close to the resonance frequency ($f_R$) of the resonant network if the bias voltage is adjusted approximately to the threshold voltage of the MOSFET switch $S_1$. If the adjustable bias voltage $V_{Bias}$ is increased above the threshold voltage, the on-period of the MOSFET switch $S_1$ increases and leads to increase of the duty cycle of the oscillating switch output voltage waveform. This leads to a decreasing oscillation frequency or switching frequency of the power converter. The decrease of the oscillation frequency leads to an increase of the peak voltage $V_{DS,PEAK}$ at the switch output as explained above in connection with equation (1), and a corresponding increase of the peak voltage across the series resonant network comprising resonant capacitor $C_R$ and resonant inductor $L_R$ due to its coupling to the switch output voltage $V_{DS}$. Furthermore, because the series resonant network exhibits inductive impedance, the decreasing oscillation frequency of the switch output voltage waveform leads to a decrease of the impedance of the series resonant network. The decrease of impedance leads in turn to increasing current and power through the series resonant network and through the load resistor $R_{LOAD}$—in effect increasing the converter output voltage $V_{OUT}$.

Consequently, the converter output voltage $V_{OUT}$ can be controlled by appropriately controlling the adjustable bias voltage $V_{Bias}$ applied to the substantially fixed inductance gate inductor $L_G$. This feature provides a highly flexible and fast way of controlling the converter output voltage $V_{OUT}$ compared to prior art mechanism based on adjustable inductances and/or capacitances. In particular, the range of adjustment of the adjustable bias voltage $V_{Bias}$ can be very wide compared to the possible regulation range of the adjustable inductances and/or capacitances.

In graph 510, the adjustable bias voltage $V_{Bias}$ has been increased to a level which results in a duty cycle of approximately 0.7 in the switch output voltage $V_{DS}$. Waveform 511 shows the switch output voltage $V_{DS}$ while waveform 513 shows the corresponding gate-source voltage applied to the gate $V_{GS}$ of $S_1$. As illustrated, the switch output voltage $V_{DS}$ has increased from a peak level of approximately 30 volt for the 0.5 duty cycle condition depicted above to approximately 50 volt. It is evident that the cycle time of the switch output voltage $V_{DS}$ has decreased to about 18 ns corresponding to an oscillation frequency of about 55 MHz. Finally, in graph 520, the adjustable bias voltage $V_{Bias}$ has been further increased to a level which results in a duty cycle of approximately 0.9 in the switch output voltage $V_{DS}$. Waveform 521 shows the switch output voltage $V_{DS}$ while waveform 523 shows the corresponding gate-source voltage applied to the gate $V_{GS}$ of $S_1$. As illustrated, the switch output voltage $V_{DS}$ has further increased from a peak level of approximately 50 volt for the 0.7 duty cycle condition depicted above to approximately 150 volt. It is evident that the cycle time of the switch output voltage $V_{DS}$ has further decreased to about 50 ns corresponding to an oscillation frequency of about 20 MHz.

FIG. 1B) is an electrical circuit diagram of a class E resonant power converter 100b comprising a pair of magnetically coupled inductors in accordance with a second embodiment of the invention. The skilled person will appreciate that the above discussed features, functions and components of the first embodiment of the class E resonant power converter 100 may apply to the present embodiment as well. Likewise, corresponding components in the first and second embodiments of the present class E resonant power converter have been provided with corresponding reference numerals to ease comparison. The main difference between the first and second embodiments is that the previously discussed separate and substantially uncoupled input inductor $L_{IN}$ and gate inductor $L_G$ have been replaced by the pair of magnetically coupled inductors $L_{In}$ and $L_G$ where the respective functions in the present class E resonant power converter 100b are similar to those of the first embodiment.

The skilled person will appreciate that magnetic coupling between the input inductor $L_{in}$ and gate inductor $L_G$ may be achieved in numerous ways for example by a closely spaced arrangement of the inductors e.g. coaxially arranged. The magnetic coupling provides a number of advantages over the first embodiment such as improved phase response between the control input and switch output of the MOSFET switch $S_1$ and larger and more constant gain. The magnetic coupling ensures that the respective inductor currents of the input inductor $L_{in}$ and gate inductor $L_G$ are out of phase. Consequently, the phase shift between control input of the switch $S_1$ and the switch output is very close to 180 degrees. Furthermore, the magnetically coupled input inductor $L_{in}$ and gate inductor $L_G$ may be configured such that the magnetic coupling is substantially constant across a wide frequency range to provide a more constant level of the first adjustable bias voltage when the output voltage $V_{OUT}$ of the power converter is regulated.

The magnetic coupling between the magnetically coupled input inductor $L_{in}$ and gate inductor $L_G$ may also be accomplished by a transformer structure as schematically indicated on FIG. 1B). The input inductor $L_{in}$ and gate inductor $L_G$ may for example be wound around a common magnetically permeable member or core. The latter embodiment has the advantage of a stronger coupling of magnetic fields between the input inductor $L_{in}$ and gate inductor $L_G$. This forces a phase shift even closer to 180 degrees between the control input of the switch $S_1$ (i.e. gate voltage of switch $S_1$) and the switch output (i.e. drain voltage of the switch $S_1$).

The magnetically coupled input inductor $L_{in}$ and gate inductor $L_G$ may be configured to possess a magnetic coupling which is sufficient to ensure that inductor current forced in $L_G$ by $L_{IN}$ is sufficiently large to drive the control input of the switch $S_1$. In this case the gate drive can also be used to drive cascode coupled transistors where the intrinsic capacitance $C_{GD}$ is small or non-existent.

FIG. 2A) is a simplified electrical circuit diagram of a class E resonant power converter 200 in accordance with a third embodiment of the invention. The present power converter is of similar topology to the above discussed power converter based on a single switch transistor $S_1$. The skilled person will appreciate that the above discussed features, functions and components of the first embodiment may apply to the present embodiment as well. Likewise, corresponding components in the first and second embodiments of the present class E resonant power converter have been provided with corresponding reference numerals to ease comparison. The main difference between the first and second embodiments lies in an addition of a series resonant circuit, comprising a cascade of capacitor $C_{MR}$ and inductor $L_{MR}$, connected between the gate node or terminal $V_{GS}$ of switch transistor $S_1$ and the negative supply rail e.g. ground. The function of the series resonant circuit is to introduce additional uneven frequency components, by attenuating one or more even harmonic frequency components, to the fundamental frequency component of the oscillating gate voltage waveform of the switch transistor $S_1$. This leads to a trapezoidal waveform shape of the gate voltage of switch transistor $S_1$ leading to faster switch turn-on and turn-off times. This is beneficial because it reduces the conduction losses, as the switch MOSFET $S_1$ will have relatively high resistance when the gate voltage is just above the threshold voltage. FIG. 2C) shows generally applicable embodiments of a series resonant network 201 a coupled to the control input, e.g. a gate terminal, of a switch transistor or a switching network of a class E or DE resonant power converter such as the class E and DE resonant power converters depicted on FIGS. 1A)-1B), FIG. 2A), FIGS. 3A)-3B), FIG. 4 and FIG. 8. The series resonant network 201 comprises a plurality of series resonant circuits of which one or more may be included in particular design of the class E or DE resonant power converter.

If a transistor switch like a MOSFET is driven by a sine wave the gate signal will be right above the threshold voltage of the MOSFET in a beginning and end of a conduction period of the MOSFET. This causes the on resistance to be very high in these periods as the MOSFET is only fully turned on when the gate signal is larger than around twice the threshold voltage. In many resonant power converters these time periods are also where the largest currents are running through the MOSFET. Hence a lot of power is dissipated in these time periods. In order to improve the turn on speed of the MOSFET, higher order harmonics can be added to the fundamental sine wave leading to a more trapezoidal gate signal as mentioned above. This can be achieved by adding one or more series resonant circuits, each preferably comprising an LC circuit, between the control input, i.e. the gate of the present MOSFET switch, and a drain or source of the MOSFET as illustrated on FIG. 2C). Here the capacitor, $C_{GDext}$, is optional and may be used to increase overall gain of the gate signal as shown in FIG. 2D). In the same way capacitor, $C_{GSext}$, can optionally be used to lower the gain. The first and second LC based series resonant circuits $C_{4HI}$ and $L_{4HI}$ and $C_{2HI}$ and $L_{2HI}$, respectively, are both connected to drain of MOSSFET switch $S_1$ and will cause higher harmonics to be in phase with the switch output voltage at the switch output, $V_{DS}$. The third and fourth LC based series resonant circuits $C_{4HO}$ and $L_{4HO}$ and $C_{2HO}$ and $L_{2HO}$, respectively, connected to the ground will cause the harmonics to be out of phase with $V_{DS}$ as illustrated in FIG. 2D). The magnitude response curve 250 of graph 245 of FIG. 2D) illustrates how a LC circuit with a resonance at the second harmonic of the switching frequency of the power converter causes a peak in the gain at the third harmonic and that it is in phase with the switch output $V_{DS}$. It can be shown that a $3^{rd}$ harmonic in phase will be desirable for a duty cycle of 25%, but for a duty cycle of 50% it would be more desirable to have the signal out of phase as this would increase the signal right after and turn on of the MOSFET and just before turn off of the MOSFET. This feature can be achieved by setting a LC series resonant circuit with resonant frequency at the $2^{nd}$ harmonic to ground instead as indicated by the third and fourth series resonant circuits $C_{4HO}$ and $L_{4HO}$ and $C_{2HO}$ and $L_{2HO}$, respectively, of FIG. 2C). By this connection, the magnitude response curve 252 of FIG. 2D) is achieved. Here a zero is seen at the $2^{nd}$ harmonic of the switching frequency and again a peak at the $3^{rd}$ harmonic, but this time with a phase shift of nearly 180 degrees (please refer to curve 252 of the phase graph 246). The skilled person will understand that the number of harmonics to include in a given power converter design will depend on several parameters as price, complexity, efficiency etc. Adding higher order harmonics will in general increase the performance of the power converter, but it is important to consider which harmonics to include and the magnitude of those harmonics compared to the fundamental. Graphs 247 and 248 of FIG. 2E) show the fundamental and the $3^{rd}$ and $5^{th}$ harmonics of the switching frequency are in and out of phase with the switch output signal for the duty cycle D set to 25% and 50%. Note that the symbol * indicates that the depicted signal is in phase with the switch output signal $V_{DS}$. By comparing, the gate drive signal waveforms with the indicated ideal (rectangular) waveform shape of the same, it is clear that it is desirable to place the fundamental out of phase with the switch output signal, but for the $3^{rd}$ and $5^{th}$ harmonic it depends on the duty cycle and the current waveform. Exemplary gate drive waveforms that can be achieved by adding harmonics by the above-described series resonant networks are shown in the graphs 247 and 248 of FIG. 2E).

FIG. 2B) is an electrical circuit diagram of a class E resonant power converter 200b comprising a series resonant circuit in accordance with a fourth embodiment of the invention. The skilled person will appreciate that the above discussed features, functions and components of the third embodiment of the class E resonant power converter 200 may apply to the present embodiment as well. Likewise, corresponding components in the third and fourth embodiments of the present class E resonant power converter have been provided with corresponding reference numerals to ease comparison. The main difference between the third and fourth embodiments is that the previously discussed a series resonant circuit, comprising the cascade of capacitor $C_{MR}$ and inductor $L_{MR}$, connected between the gate node or terminal $V_{GS}$ of switch transistor $S_1$ and ground have been replaced by another type of resonant circuit comprising the parallelly coupled capacitor $C_{MR}$ and inductor $L_{MR}$. The parallelly coupled capacitor $C_{MR}$ and inductor $L_{MR}$ are connected between the adjustable bias voltage $V_{Bias}$ and the gate inductor $L_g$. This connection with the parallelly coupled capacitor $C_{MR}$ and inductor $L_{MR}$ provides the same advantages as the series resonant circuit employed in the third embodiment, but with much smaller inductances of inductors $L_g$ and $L_{MR}$ leading to a significant reduction in costs and size.

FIG. 3A) is a simplified electrical circuit diagram of a class DE resonant power converter or inverter 300 in accordance with a fifth embodiment of the invention. The present resonant power inverter 300 is based on a switching network which comprises a half-bridge semiconductor topology. The present DE resonant power converter 300 provides several important advantages. One of the biggest challenges when designing resonant power converters is a huge voltage stress imposed on the switch element in the single switch power converter topology described above in connection with the first, second, third and fourth embodiments of the invention. This voltage stress may reach 3-4 times the level of the DC input voltage. Using a half bridge switch topology instead limits a peak voltage across the each of the semiconductor switches $S_1$ and $S_2$ to a level of the input voltage. However, this requires a fast and efficient high side driver which can pose a significant advantage if an operating frequency or switching frequency above approximately 5 MHz is desired. The present generation of the first adjustable bias voltage solves this problem as it can also be used as a high side drive ($V_{Bias1}$) at several tens of megahertz. The half-bridge comprises a cascade of the first semiconductor switch $S_1$ coupled between a switch output terminal 311 and ground and a second semiconductor switch $S_2$ coupled between the switch output terminal 311 and a DC input voltage rail supplied through power input terminal 302 from an external DC voltage source or generator 304. A coupling or mid-point node interconnecting the first and second semiconductor switches $S_1$ and $S_2$ form the switch output terminal 311. This switch output terminal 311 is the drain terminal of the first semiconductor switch $S_1$. This switch output terminal or node 311 is coupled to a first side of a series resonant network comprising resonant capacitor $C_R$ and resonant inductor $L_R$. A drain node of the transistor switch $S_2$, coupled to the DC input voltage, comprises the switch input terminal of the present half-bridge switch. Each of semiconductor switches $S_1$ and $S_2$ may comprise a NMOS power transistor as illustrated by the switch symbol. Intrinsic drain-gate, gate-source and drain-source capacitances of the first NMOS transistor switch $S_1$ are depicted as $C_{GD2}$, $C_{GS2}$ and $C_{DS2}$ and likewise as $C_{GD1}$, $C_{GS1}$ and $C_{DS1}$ for NMOS transistor switch $S_2$.

The resonant capacitor $C_R$, intrinsic drain-source capacitances of switches $S_1$ and $S_2$, $C_{DS1}$ and $C_{DS2}$, respectively, and the resonant inductor $L_R$ in conjunction form a resonant network of the power converter 300. A second and opposite side of the series resonant network is coupled to an output terminal 314 or node of the power converter 300. A converter load is schematically illustrated by a load resistor $R_{LOAD}$ connected to the converter at the output terminal 314 and may generally exhibit inductive, capacitive or resistive impedance. The class DE resonant power inverter 300 furthermore includes a self-oscillating feedback loop arranged around the transistor switch $S_1$ such that an oscillation frequency of the loop sets the switching or operational frequency of the power converter in a manner similar to the one discussed in detail above in connection with the first embodiment of the invention. The self-oscillating feedback loop comprises an intrinsic gate-drain capacitance $C_{GD2}$ of the transistor switch $S_1$ and a first gate inductor $L_{G2}$ which preferably comprises a substantially fixed inductance as discussed above. The gate inductor $L_{G2}$ is coupled in-between a variable bias voltage $V_{Bias2}$ and the gate terminal $V_{GS2}$ of the transistor switch $S_1$. The variable bias voltage $V_{Bias2}$ may be generated in numerous ways by a suitably configured bias voltage generator or source for example as explained in further detail below in connection with FIG. 4. In addition to the circuitry forming the self-oscillating feedback loop arranged around transistor switch $S_1$, the current power inverter 300 comprises a second or high side adjustable bias voltage $V_{Bias1}$ that is coupled to the gate terminal of the second semiconductor switch $S_2$ through a cascade of a second substantially fixed inductance $L_H$ and a third substantially fixed inductance $L_{G1}$. The inductances of the gate inductors $L_{G2}$ and $L_{G1}$ may be substantially identical. A feedback capacitor $C_{G1}$ is coupled between the switch output node 311 and an intermediate node between the second and third substantially fixed inductances $L_H$ and $L_{G1}$. The feedback capacitor $C_{G1}$ serves as a bootstrap device which raises the voltage level supplied to the upper transistor switch $S_2$ and facilitates use of a N-channel MOSFET transistor as switch device. The inductor $L_H$ serves as a high impedance signal path at the oscillation frequency allowing passage of a relatively slowly varying bias voltage component generated by the second adjustable bias voltage $V_{Bias1}$, but blocking passage of a relatively high frequency voltage component supplied through the bootstrap capacitor or feedback capacitor $C_{G1}$. Consequently, combining the bias voltage components from $L_H$ and $C_{G1}$, the gate control voltage at the gate terminal of the second switch $S_2$ is level shifted. In this manner, the gate control voltage is referred to the switch output node 311 instead of ground. The self-oscillation loop ensures that each of the semiconductor switches $S_1$ and $S_2$ is alternately switched between conducting and non-conducting states in opposite phase in a non-overlapping manner. Thereby, the switch output node 311 becomes alternatively clamped to the DC input voltage $V_{IN}$ and ground through the semiconductor switches $S_1$ and $S_2$ at a frequency defined by the oscillation frequency of the self-oscillating loop.

The duty cycle of the switch output voltage waveforms and hence the converter output voltage at $V_{out}$ can once again be controlled by synchronously controlling the respective bias voltages supplied by the first and second adjustable bias voltages $V_{Bias2}$ and $V_{Bias1}$.

FIG. 3B) is an electrical circuit diagram of a class DE resonant power converter 300b comprising a pair of magnetically coupled inductors $L_{G1}$ and $L_{G2}$ in accordance with a sixth embodiment of the invention. The skilled person will appreciate that the above discussed features, functions and components of the first embodiment of the class DE resonant power converter 300 may apply to the present embodiment as well. Likewise, corresponding components in the fifth and sixth embodiments of the present resonant power converters have been provided with corresponding reference numerals to ease comparison. The main difference between the fifth and sixth embodiments is that the previously discussed separate and substantially uncoupled gate inductors $L_{G1}$ and $L_{G2}$ have been replaced by the pair of magnetically coupled inductors $L_{G1}$ and $L_{G2}$ where their respective functions in the present class E resonant power converter 300b are similar to those of the first embodiment. The skilled person will appreciate that magnetic coupling between the gate inductors $L_{G1}$ and $L_{G2}$ may be achieved in numerous ways for example by a closely spaced arrangement of the inductors e.g. coaxially arranged. The magnetic coupling provides a number of advantages over the above-described first embodiment of the class DE resonant power converter 300 such as improved phase response between the respective gate signals at the gate terminals, or control inputs, of the inductors $L_{G1}$ and $L_{G2}$ and larger gain. The magnetic coupling ensures that the respective inductor currents in the inductors $L_{G1}$ and $L_{G2}$ are out of phase. Hence, forcing a phase shift that is substantially 180 degrees between the gate signals of the inductors $L_{G1}$ and $L_{G2}$.

The magnetic coupling between the inductors may also be accomplished by a transformer structure as schematically indicated on FIG. 3B) wherein the inductors $L_{G1}$ and $L_{G2}$ are wound around a common magnetically permeable core. The latter embodiment has the advantage that a larger magnetic coupling between the inductors $L_{G1}$ and $L_{G2}$ can be achieved and the relative phase shift of substantially 180 degrees between the respective gate signals or voltages of the MOSFET switches $S_1$ and $S_2$ is enforced even stronger.

Figure 4:
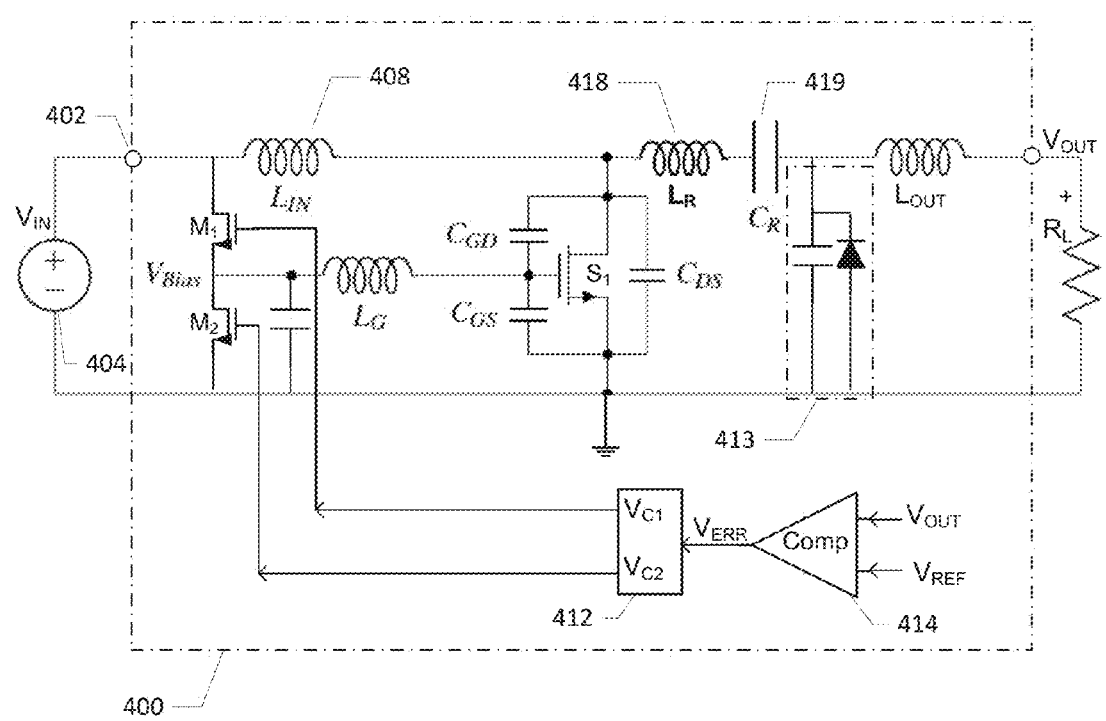
FIG. 4 is an electrical circuit diagram of an exemplary DC-DC power converter based on the class E resonant power converter in accordance with the first embodiment of the invention.

FIG. 4 is a schematic electrical circuit diagram of a DC-DC or switched mode power converter/supply (SMPS) 400 which is based on the class E resonant power converter or inverter 100 disclosed above in a first embodiment of the invention. The DC-DC power converter 400 comprises, in addition to the circuitry of the class E resonant power converter 100, a voltage control loop controlling the level of a DC output voltage $V_{OUT}$ of the DC-DC converter and a rectifier 413 schematically illustrated by a storage capacitor and a diode. The rectifier 413 preferably includes a series inductor coupled between the illustrated diode and the output voltage terminal $V_{OUT}$. The skilled person will appreciate that the illustrated diode(s) based rectifier 413 may be replaced by a synchronous rectifier based on one or more actively controlled semiconductor switches rather than diodes as described in additional detail below with reference to FIG. 8. The voltage control loop regulates respective resistances of a pair of pull-up and pull-down MOSFET resistors $M_1$ and $M_2$ forming part of bias voltage source or generator supplying the adjustable bias voltage $V_{Bias}$. The adjustable bias voltage $V_{Bias}$ is applied to the gate terminal of transistor switch $S_1$ through the gate inductor $L_G$ as explained in connection with FIG. 1A) above. The voltage control loop comprises a comparator or error amplifier 414 which has a first input coupled to a DC or AC reference voltage $V_{REF}$ and a second input coupled to the DC output voltage $V_{OUT}$ of the converter. A resulting error signal $V_{ERR}$ reflecting whether the output voltage is lower or higher than the reference voltage is fed to an optional level converter 414. The level converter 414 is configured to provide appropriate gate control signals $V_{C1}$ and $V_{C2}$ for the pair of pull-up and pull-down MOSFET resistors $M_1$ and $M_2$ to either increase or decrease the adjustable bias voltage $V_{Bias}$. The bias voltage source or generator comprises the MOSFET resistors $M_1$ and $M_2$ coupled between the DC input voltage and ground. Hence, the adjustable bias voltage $V_{Bias}$ can either be pulled towards the DC input voltage or ground depending on the adjustable on-resistances of the MOSFET resistors $M_1$ and $M_2$. The skilled person will appreciate that the voltage control loop can be configured in numerous ways to provide appropriate control signals to the MOSFET resistors $M_1$ and $M_2$ for example by proportional voltage control or by purely binary voltage control, i.e. up/down.

Figure 6:
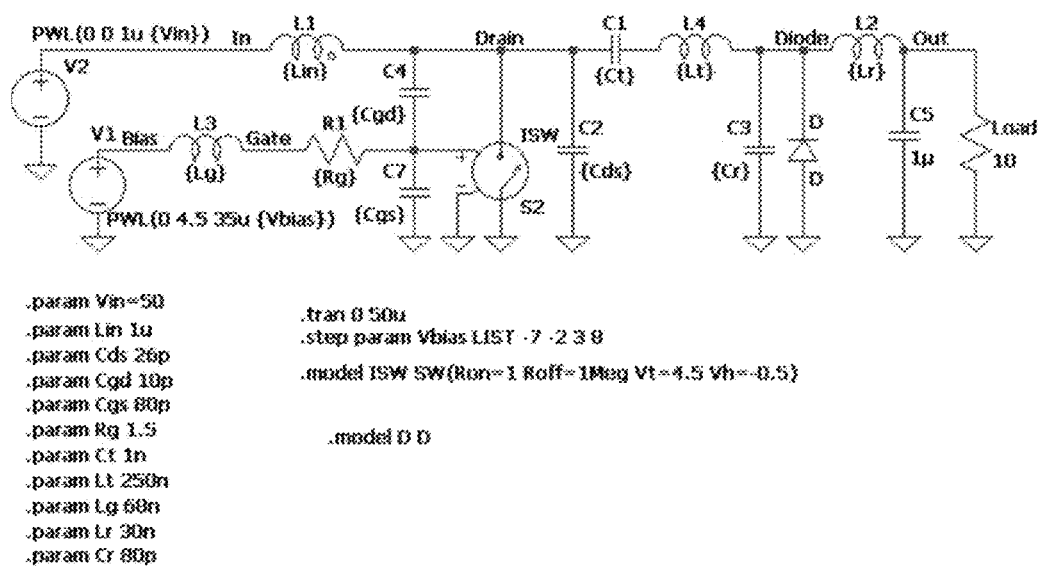
FIG. 6 is a circuit simulation model of a second exemplary DC-DC power converter based on the first embodiment of the class E resonant power converter.

FIG. 6 is a circuit simulation model of a second DC-DC power converter based on the first embodiment of the class E resonant power converter. The DC-DC converter comprises a rectifier coupled between an output of the series resonant circuit, including C1 and L4, and a load resistance R6 coupled to an output voltage of the converter. The rectifier comprises components C3, D, L2 and C5. Inductor and capacitor component values of the second DC-DC power converter are listed on the figure in Henry and Farad, respectively. Accordingly, the inductance of the gate inductor Lg is set to a substantially fixed value of 68 nH. The semiconductor switch is modelled by an ideal switch ISW with the listed parameters, i.e. an on-state resistance of 1.0Ω off-state resistance of 1 MΩ and threshold voltage of 4.5 V.

Figure 7:
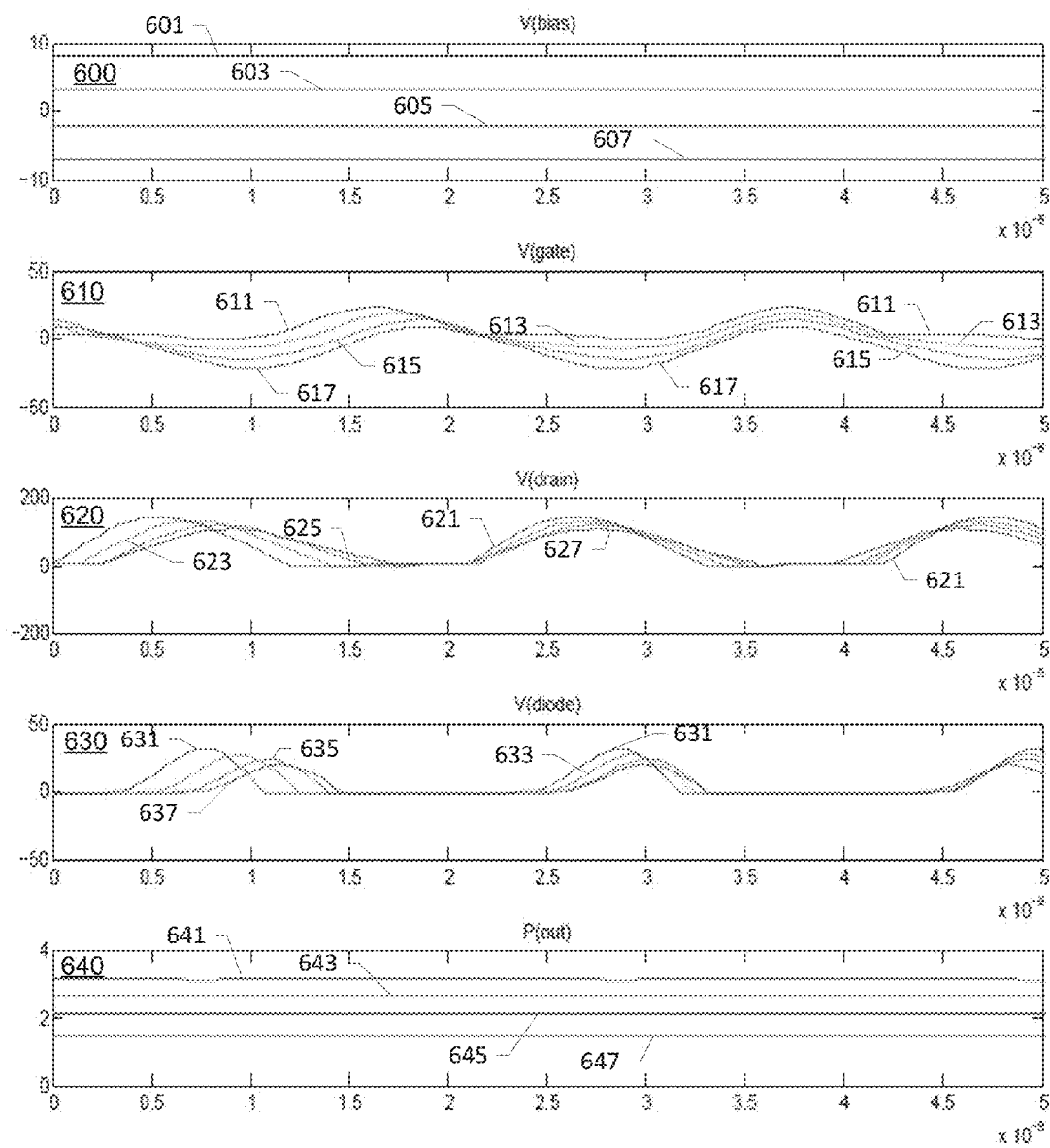
FIG. 7 shows a series of graphs illustrating various simulated voltage waveforms of the second DC-DC power converter for four different DC bias voltage levels of an adjustable bias voltage.

FIG. 7 shows a series of graphs 600, 610, 620, 630 and 640 illustrating various simulated voltage waveforms of the simulation model of the second DC-DC power converter for four different fixed DC bias voltage levels of the adjustable bias voltage $V_{bias}$. $V_{bias}$ is stepped through fixed DC voltage levels of −7.0, −2.0, 3.0 and 8.0 volt as illustrated by waveforms 607, 605, 603, 601, respectively, of graph 600 showing the DC bias voltage level. The DC input voltage V2 (Vin) is kept constant at 50 volts for all simulations.

The scale on the y-axis of all graphs indicates voltage in volts while the x-axis scale indicates time in steps of 0.01 μs such that the entire x-axis spans over about 0.05 μs.

Graph 610 illustrates the corresponding oscillating control input voltage waveforms 617, 615, 613, 611 at the indicated gate node (refer to FIG. 6) for the four different levels of the DC bias voltage. The higher average level of the oscillating control input voltage waveforms for the highest DC bias voltage of 8.0 V is evident. Graph 620 illustrates the corresponding switch output voltage waveforms 627, 625, 623, 621 at the switch output node i.e. at the indicated drain node (refer to FIG. 6). The longer conducting states or on-states of the switch ISW for the highest DC bias voltage of 8.0 V is evident leading to a lower oscillation frequency or switching frequency of the converter.

Graph 640 illustrates the corresponding load power waveforms 627, 625, 623, 621 for the power delivered the load resistor R6 through the converter output. The gradually increasing load power from about 1.5 W at the lowest DC bias voltage of −7.0 V to about 3.5 W at the highest DC bias voltage of 8.0 V is evident. Hence, converter output power and therefore converter output voltage can be controlled by adjusting the voltage supplied by the adjustable bias voltage $V_{bias}$.

Figure 8:
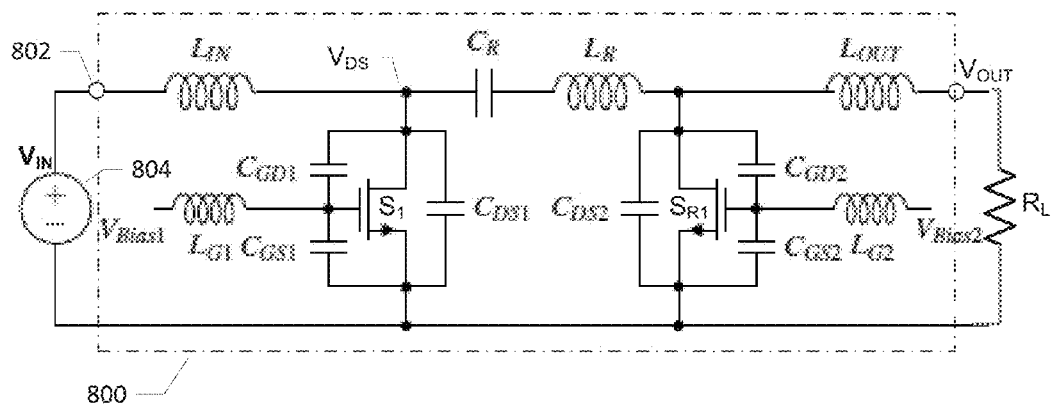
FIG. 8 is an electrical circuit diagram of a third DC-DC power converter with synchronous rectification on the output side based on the class E resonant power converter in accordance with the first embodiment of the invention

FIG. 8 is a schematic electrical circuit diagram of a DC-DC or switched mode power converter/supply (SMPS) 800 based on the class E resonant power converter or inverter 100 according to the first embodiment of the invention discussed above.

The DC-DC power converter 800 comprises, in addition to the circuitry of the class E resonant power converter 100, a synchronous rectifier building around transistor switch $S_{R1}$ and comprising additional passive components $L_{G2}$ and $L_{OUT}$. The skilled person will understand that the DC-DC power converter 800 may comprise an output capacitor coupled from $V_{OUT}$ to the negative supply rail (e.g. ground) and a voltage control loop similar to the one discussed above in connection with FIG. 4 in the fourth embodiment of the invention. The voltage control loop being configured to control the output voltage at $V_{OUT}$ of the power converter 800 as defined by a DC or AC reference voltage. The transistor switch element $S_{R1}$ and inductors $L_{G2}$ and $L_{OUT}$ provide a synchronous rectifier in the DC-DC power converter 800 and replaces the diode based asynchronous rectifier circuit 413 discussed above. Since the control input, e.g. the gate drive signal, of the switching network of the present class E and DE resonant power converters does not need a traditional PWM or PDM type of control signal (but only the two adjustable bias voltage $V_{Bias1}$ and $V_{Bias2}$), the resonant power converters in accordance with the present embodiments are generally very well suited for synchronous rectification as illustrated on FIG. 8 for this particular embodiment. The traditional PWM or PDM type of control signals are not required because is not necessary to control a phase between the respective control input signals of the first transistor switch $S_1$ and the rectification transistor switch $S_R$. The rectification transistor switch $S_{R1}$ may for example be coupled to a suitable fixed rectifier DC bias voltage $V_{Bias2}$ applied to the inductor $L_{G2}$ coupled to the gate (i.e. control input) of $S_{R1}$. For rectification purposes, the gate terminal of $S_{R1}$ is driven by an oscillation output voltage, i.e. the drain voltage $V_{DS}$, of the first semiconductor switch $S_1$ to automatically maintain synchronous operation between $S_1$ and SR1. This absence of the traditional PWM or PDM type of control signals on the respective gate terminals of the first transistor switch $S_1$ and rectification transistor switch $S_{R1}$ is a significant advantage leading to simplified power converter design and smaller component count. In isolated power converter applications, the present diode based asynchronous rectifier circuit 413 possess an additional advantage because it eliminates the need for transmitting or communicating the traditional PWM or PDM type control signal or signals across a voltage isolation barrier of the resonant power converter. This type of voltage isolation barrier will typically require expensive and space consuming components like optocouplers or fast transformers in traditional power converter topologies. As illustrated by FIG. 8, the present DC-DC power converter with synchronous rectification may be completely symmetrical in terms of circuit topology across a series resonant network comprising resonant capacitor $C_R$ and resonant inductor $L_R$ allowing for bidirectional power flow between the DC input power source $V_{IN}$ 804 and the output voltage at $V_{OUT}$. The skilled person will appreciate that the input transistor switch $S_1$ and rectifier transistor switch $S_{R1}$ may be substantially identical or different components and the same applies to the fixed inductance inductors $L_{G2}$ and $L_{G1}$ depending on factors such as the voltage conversion ratio of the resonant power converter.

The skilled person will appreciate that the above-described synchronous rectifier may be added to each of the above discussed class E and DE resonant power converter embodiments depicted above on FIG. 1B), FIGS. 2A)-2B) and FIGS. 3A)-3B).

The invention claimed is:

1. A resonant power converter comprising:
an input terminal for receipt of an input voltage;
a switching network comprising a first semiconductor switch controlled by a control input;
the switching network comprising a switch input operatively coupled to the input terminal for receipt of the input voltage and a switch output operatively coupled to an input of a resonant network of the resonant power converter;
the resonant network comprising a predetermined resonance frequency (fR) and an output operatively coupled to a converter output terminal; and
a self-oscillating, feedback loop coupled from the switch output to a control input of the switching network to set a switching frequency of the power converter, the self-oscillating feedback loop further comprising:
a first intrinsic switch capacitance coupled between the switch output and the control input of the switching network;
a first bias voltage source configured to generate a first adjustable bias voltage;

a first inductor with substantially fixed inductance coupled in-between the first bias voltage source and the control input of the switching network; and a voltage regulation loop configured to control an output voltage of the power converter by controlling the first adjustable bias voltage applied to the first inductor, wherein the substantially fixed inductance of the first inductor is set such that a peak voltage at the control input of the switching network exceeds a threshold voltage of the first semiconductor switch of the switching network.

2. The resonant power converter according to claim 1, further comprising:

an input inductor coupled between the input terminal and the switch input and wherein the control terminal of the first semiconductor switch is coupled to the control input of the switching network and an output terminal of the first semiconductor switch is coupled to the switch input and to the switch output.

3. The resonant power converter according to claim 2, wherein the input inductor and the first inductor are magnetically coupled with a predetermined magnetic coupling coefficient.

4. The resonant power converter according to claim 1, wherein the first semiconductor switch is coupled between the switch output and a voltage supply rail of the resonant power converter and the control terminal of the first semiconductor switch is coupled to the control input of the switching network, a second semiconductor switch coupled between the switch output and the input terminal; and wherein a control terminal of the second semiconductor switch is coupled to a second bias voltage source through a cascade of a second inductor with substantially fixed inductance and a third inductor with substantially fixed inductance, and wherein a feedback capacitor is coupled between the switch output and an intermediate node between the second and third inductors.

5. The resonant power converter according to claim 4, wherein the first inductor and the third inductor are magnetically coupled with a predetermined magnetic coupling coefficient.

6. The resonant power converter according to claim 1, wherein the voltage regulation loop comprises:

a reference voltage generator supplying a reference DC or AC voltage to a first input of a comparator, a second input of the comparator being coupled to the converter output voltage, an output of the of the comparator operatively coupled to a control input of the first bias voltage source.

7. The resonant power converter according to claim 1, wherein the first inductor has an inductance between 1 nH and 10 µH.

8. A resonant power converter according to claim 1, wherein the substantially fixed inductance of the first inductor is selected such that a peak-peak voltage swing at the control input of the switching network is approximately equal to a numerical value of the threshold voltage of the at least one of the semiconductor switches of the switching network.

9. The resonant power converter according to claim 1, wherein the self-oscillating feedback loop further comprises:

a first series resonant circuit coupled in-between the control input of the first semiconductor switch and fixed electric potential of the converter, and a second series resonant circuit coupled in-between the control input of the first semiconductor switch and the switch output.

10. The resonant power converter according to claim 1, wherein the self-oscillating feedback loop further comprises:

a parallel resonant circuit coupled in series with the first inductor in-between the first adjustable bias voltage and the first inductor.

11. The resonant power converter according to claim 1, further comprising:

a rectifier coupled between the output of the resonant network and the converter output terminal to provide a rectified DC output voltage.

12. The resonant power converter according to claim 11, wherein the rectifier comprises a synchronous rectifier.

13. The resonant power converter according to claim 12, wherein the synchronous rectifier comprises:

a rectification semiconductor switch configured to rectify an output voltage of the resonant network in accordance with a rectifier control input of the rectification semiconductor switch, a first rectification inductor with a substantially fixed inductance coupled in-between a fixed or adjustable rectifier bias voltage and the rectifier control input.

14. A resonant power converter according to claim 13, wherein the fixed or adjustable rectifier bias voltage is coupled to a fixed DC bias voltage source or to the rectified DC output voltage through a resistive or capacitive voltage divider.

15. A resonant power converter assembly comprising:

a resonant power converter according claim 1, a carrier substrate having at least the switching network and the resonant circuit integrated thereon, an electrical trace pattern of the carrier substrate forming the first inductor.

16. The resonant power converter assembly according to claim 12, wherein the carrier substrate comprises a semiconductor die.

17. The resonant power converter according to claim 1, wherein the first inductor has an inductance between 1 nH and 50 nH.

18. A resonant power converter comprising:

an input terminal for receipt of an input voltage;

a switching network comprising a first semiconductor switch controlled by a control input;

the switching network comprising a switch input operatively coupled to the input terminal for receipt of the input voltage and a switch output operatively coupled to an input of a resonant network of the resonant power converter;

the resonant network comprising a predetermined resonance frequency (fR) and an output operatively coupled to a converter output terminal;

a self-oscillating feedback loop coupled from the switch output to a control input of the switching network to set a switching frequency of the power converter, the self-oscillating feedback loop further comprising:

a first intrinsic switch capacitance coupled between the switch output and the control input of the switching network;

a first bias voltage source configured to generate a first adjustable bias voltage;

a first inductor with substantially fixed inductance coupled in-between the first bias voltage source and the control input of the switching network; and a voltage regulation loop configured to control an output voltage of the power converter by controlling the first adjustable bias voltage applied to the first inductor, wherein the first semiconductor switch is coupled between the switch output and a voltage supply rail of the resonant power converter and a control terminal of the first semiconductor switch is coupled to the control input of the switching network; and a second semiconductor switch coupled between the switch output and the input terminal;

wherein a control terminal of the second semiconductor switch is coupled to a second bias voltage source through a cascade of a second inductor with substantially fixed inductance and a third inductor with substantially fixed inductance, and wherein a feedback capacitor is coupled between the switch output and an intermediate node between the second and third inductors.

19. The resonant power converter according to claim 18, wherein the substantially fixed inductance of the first inductor is set such that a peak voltage at the control input of the switching network exceeds a threshold voltage of the first semiconductor switch of the switching network.

20. The resonant power converter according to claim 18, wherein the first inductor and the third inductor are magnetically coupled with a predetermined magnetic coupling coefficient.

21. The resonant power converter according to claim 18, wherein the voltage regulation loop comprises:
a reference voltage generator supplying a reference DC or AC voltage to a first input of a comparator,
a second input of the comparator being coupled to the converter output voltage, an output of the of the comparator operatively coupled to a control input of the first bias voltage source.

22. The resonant power converter according to claim 18, wherein the first inductor has an inductance between 1 nH and 10 μH.

23. The resonant power converter according to claim 18, wherein the substantially fixed inductance of the first inductor is selected such that a peak-peak voltage swing at the control input of the switching network is approximately equal to a numerical value of the threshold voltage of the at least one of the semiconductor switches of the switching network.

24. The resonant power converter according to claim 18, wherein the self-oscillating feedback loop further comprises:
a first series resonant circuit coupled in-between the control input of the first semiconductor switch and fixed electric potential of the converter, and
a second series resonant circuit coupled in-between the control input of the first semiconductor switch and the switch output.

25. The resonant power converter according to claim 18, wherein the self-oscillating feedback loop further comprises:
a parallel resonant circuit coupled in series with the first inductor in-between the first adjustable bias voltage and the first inductor.

26. The resonant power converter according to claim 18, further comprising:
a rectifier coupled between the output of the resonant network and the converter output terminal to provide a rectified DC output voltage.

27. The resonant power converter according to claim 26, wherein the rectifier comprises a synchronous rectifier.

28. The resonant power converter according to claim 27, wherein the synchronous rectifier comprises:
a rectification semiconductor switch configured to rectify an output voltage of the resonant network in accordance with a rectifier control input of the rectification semiconductor switch,
a first rectification inductor with a substantially fixed inductance coupled in-between a fixed or adjustable rectifier bias voltage and the rectifier control input.

29. The resonant power converter according to claim 28, wherein the fixed or adjustable rectifier bias voltage is coupled to a fixed DC bias voltage source or to the rectified DC output voltage through a resistive or capacitive voltage divider.

30. A resonant power converter assembly comprising:
a resonant power converter according claim 18,
a carrier substrate having at least the switching network and the resonant circuit integrated thereon,
an electrical trace pattern of the carrier substrate forming the first inductor.

31. The resonant power converter assembly according to claim 30, wherein the carrier substrate comprises a semiconductor die.

32. The resonant power converter according to claim 18, wherein the first inductor has an inductance between 1 nH and 50 nH.

* * * * *